(12) United States Patent
Baba

(10) Patent No.: US 11,301,291 B2
(45) Date of Patent: Apr. 12, 2022

(54) INFORMATION PROCESSING APPARATUS, MANAGEMENT SYSTEM, AND CONTROL METHOD THEREOF

(71) Applicant: CANON KABUSHIKI KAISHA, Tokyo (JP)

(72) Inventor: Shohei Baba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 198 days.

(21) Appl. No.: 16/709,592

(22) Filed: Dec. 10, 2019

(65) Prior Publication Data

US 2020/0201672 A1 Jun. 25, 2020

(30) Foreign Application Priority Data

Dec. 21, 2018 (JP) .............................. JP2018-239398

(51) Int. Cl.
*G06F 9/48* (2006.01)
*G06F 9/451* (2018.01)
*G06F 9/54* (2006.01)

(52) U.S. Cl.
CPC ............ *G06F 9/4843* (2013.01); *G06F 9/451* (2018.02); *G06F 9/542* (2013.01); *G06F 9/546* (2013.01)

(58) Field of Classification Search
CPC ...... G06F 9/466; G06F 9/4843; G06F 9/4881; G06F 9/52
USPC .................................. 718/100, 101, 102, 106
See application file for complete search history.

(56) References Cited

U.S. PATENT DOCUMENTS

| 7,137,116 B2 * | 11/2006 | Parkes | G06F 9/4843 718/102 |
| 9,430,290 B1 * | 8/2016 | Gupta | G06F 9/52 |
| 2019/0114535 A1 * | 4/2019 | Ng | G06N 3/0454 |
| 2020/0184366 A1 * | 6/2020 | Mandal | G06N 3/08 |

FOREIGN PATENT DOCUMENTS

JP 2009-296242 A 12/2009

* cited by examiner

*Primary Examiner* — Andy Ho
(74) *Attorney, Agent, or Firm* — Canon U.S.A., Inc. IP Division

(57) ABSTRACT

A management client acquires, from a management server, information about a batch task corresponding to a batch task execution instruction received from the management server, divides a task of each stage defined in the batch task into subtasks for respective network devices as execution targets, on a basis of the information about the batch task, executes the subtasks in parallel in the network devices as execution targets, and notifies the management server of an execution result.

14 Claims, 14 Drawing Sheets

FIG.6

| TASK ID | TASK TYPE | TASK NAME | SCHEDULE | NEXT EXECUTION DATE AND TIME | CONTENT |
|---|---|---|---|---|---|
| TASK1 | BATCH TASK | Name1 | 10 O'CLOCK EVERY DAY | 20xx/yy/zz 10:00:00 | {...} |
| TASK2 | XXX TASK | ... | ... | ... | ... |
| ... | ... | ... | ... | ... | ... |

601

```
[
  {
    "task": {
      "taskType": "Deliver Address Books",
      "name": "nameA",
      "contents": {...}
    },
    "taskId": "xxxxxxx-xxxx-...",
    "succeed": [],
    "failed": [],
    "unitType": "Task"
  },
  ...
]
```

FIG.7

```
[
  {
    "unitType": "Task",
    "taskId": "02c56ba0-205a-4e82-8581-54f7313cff97",
    "succeed": [],
    "failed": []
  },
  {
    "unitType": "Task",
    "taskId": "07b41e86-c609-431b-8c87-f8f0e05861cc",
    "succeed": [
      {
        "unitType": "Task",
        "taskId": "7c636b78-611b-4dfa-bce8-5c47465ed3e2",
        "succeed": [],
        "failed": []
      },
      {
        "unitType": "Task",
        "taskId": "449abc80-e809-4c8d-aefc-43420824c315",
        "succeed": [],
        "failed": []
      }
    ],
    "failed": [
      {
        "unitType": "ErrorExit",
        "taskId": "46395d60-3460-4b20-8063-bf56d2adabd6",
        "succeed": [],
        "failed": []
      }
    ]
  },
  {
    "unitType": "Task",
    "taskId": "cff8b442-7a77-47e9-8ed4-60365223357f",
    "succeed": [],
    "failed": []
  }
]
```

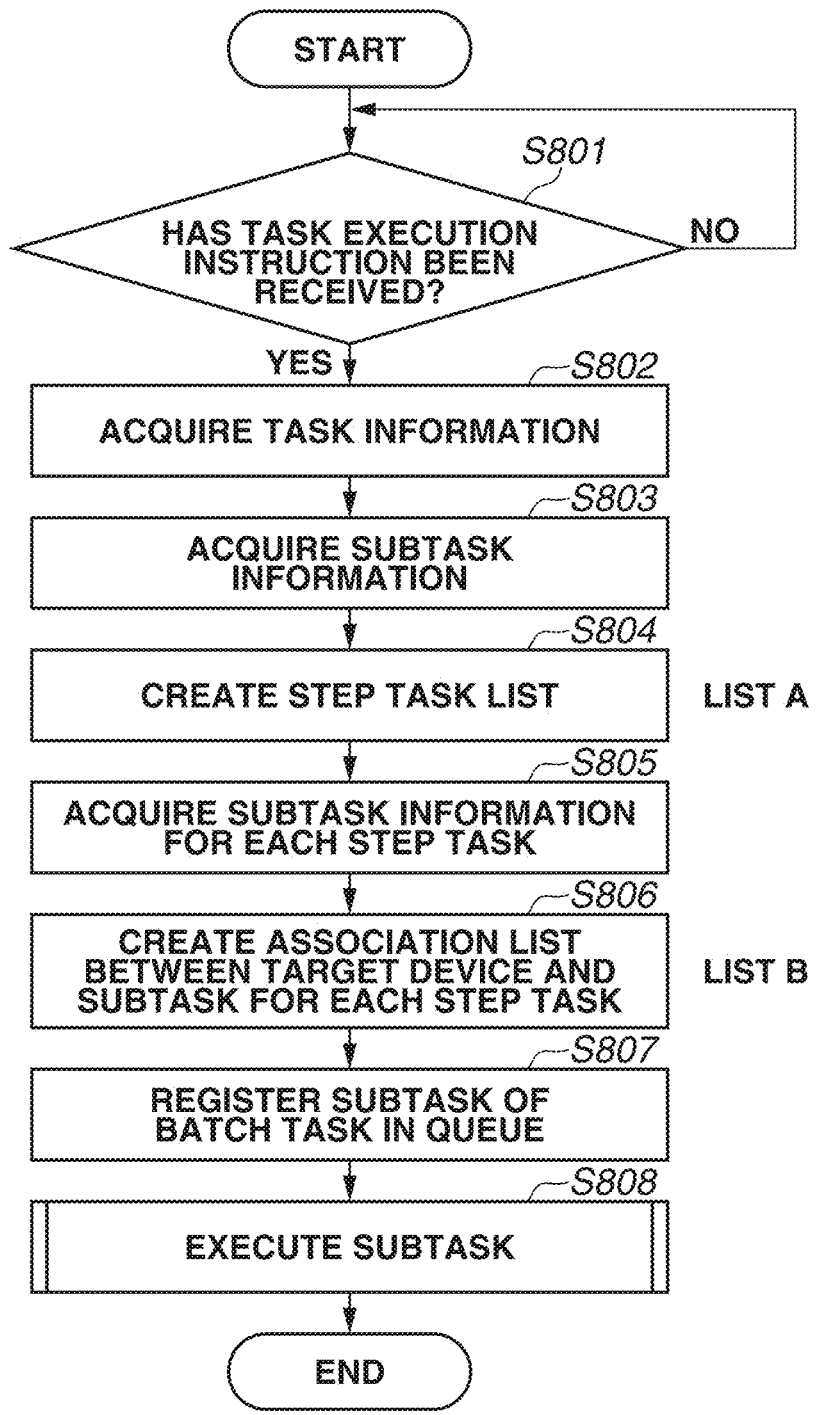

FIG. 12

Task Logs

| Name | Type | Status | Task ID | Ended Date |
|---|---|---|---|---|
| Batch | Batch | Running › | 66efe853-85ff-47a9-aae2-c19e057bc4b8 | |
| FirmUpdate | Firmware Update | Success › | 7a7d176f-7b86-490a-b2db-9fea8191805d | 2018/5/20 10:30:38 |
| ⋮ | ⋮ | › | ⋮ | ⋮ |
| ⋮ | ⋮ | › | ⋮ | ⋮ |
| ⋮ | ⋮ | › | ⋮ | ⋮ |
| ⋮ | ⋮ | › | ⋮ | ⋮ |

| Device Name ▲ | Location | Status | Ended Date |
|---|---|---|---|
| Device1 | Tokyo Office | Running › | 2018/5/8 10:30:21 |
| ... | ... | ⊗ Error › | ... |
| ... | ... | Success › | ... |
| ... | ... | ... › | ... |
| ... | ... | ... › | ... |
| ... | ... | ... › | ... |
| ... | ... | ... › | ... |

Log Detail — Task Info | Targets

◄ ► |◄ 1 ►| 1-7/7

TaskLogs

INFORMATION PROCESSING APPARATUS, MANAGEMENT SYSTEM, AND CONTROL METHOD THEREOF

BACKGROUND

Field

The present disclosure relates to processing control of a batch task in which a task of one or more stages is defined for one or more network devices.

Description of the Related Art

Japanese Patent Application Laid-Open No. 2009-296242 discusses a system for causing a plurality of devices, such as multifunction apparatuses, to execute a plurality of task processes. In the system, a processing procedure is divided into tasks and the tasks are allocated among different devices and executed in the devices.

Meanwhile, there is also a system that includes a management server in a device management system. The management server manages and executes, as a batch task, a plurality of processes, such as various setup information distribution, address book distribution, and application distribution for a plurality of devices. In the case of the latter system, processes defined in a batch task are executed on a task basis by a plurality of devices.

SUMMARY

It has now been determined that using a device management system with a management server as described above in the related art, the following issue may occur in a case where an error occurs in the middle of a batch task.

For example, in a case where an error occurs in one of processing target devices in a process of the first task, there arises an issue that, even in a device in which the process of the first task has been successfully completed, a subsequent task is not executed since each process is controlled based on a task (on a task basis). There also arises another issue that, in a case where a task in a previous stage has been delayed in some devices among the processing target devices, an influence on a processing speed is exerted on all processing target devices performing the batch task.

In consideration of the above-discussed issues, according to an aspect of the present disclosure, an information processing apparatus that receives, from a management apparatus that manages a batch task in which a task of one or more stages is defined for one or more network devices, an execution instruction of the batch task, the information processing apparatus includes at least one memory storing instructions, and at least one processor executing the instructions causing the information processing apparatus to acquire information about a batch task corresponding to the execution instruction from the management apparatus, divide a task of each stage defined in the batch task into subtasks for the respective one or more network devices as execution targets, on a basis of the information about the batch task, execute the subtasks in parallel in the one or more network devices as execution targets, and notify the management apparatus of an execution result of the subtasks.

Further features of the present disclosure will become apparent from the following description of exemplary embodiments with reference to the attached drawings.

BRIEF DESCRIPTION OF THE DRAWINGS

FIG. 6 is a diagram illustrating an example of a table in which schedule task information is registered.

FIG. 7 is a diagram illustrating an example of content information in batch processing.

FIG. 8 is a flowchart illustrating an example of task execution operation processing of a management client.

FIG. 12 is a diagram illustrating an example of a result screen of a task by the management server according to the present exemplary embodiment.

FIG. 13 is a diagram illustrating an example of a screen indicating results of a task by the management server according to the present exemplary embodiment.

DESCRIPTION OF THE EMBODIMENTS

Hereinafter, with reference to drawings, a mode for carrying out the present disclosure will be described.
<System Configuration>

Figure 1:
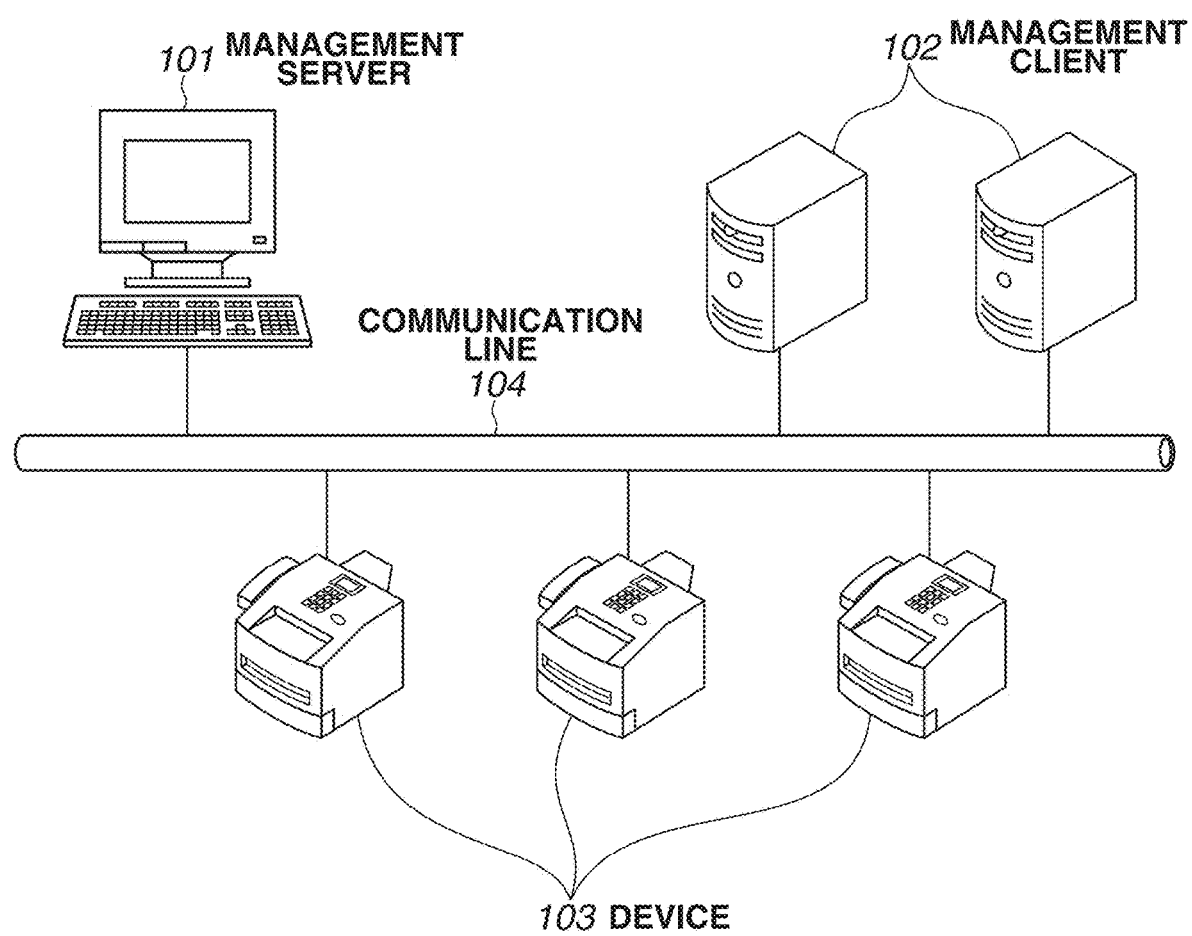
FIG. 1 is a diagram illustrating an example of the whole configuration of a system according to the present exemplary embodiment.

FIG. 1 is a diagram illustrating an example of the entire configuration of a system according to an exemplary embodiment of the present disclosure.

The system according to the present exemplary embodiment is a device management system and includes one or more devices, one or more management clients that execute a plurality of task processes for the one or more devices, and a management server that manages the one or more management clients.

In FIG. 1, a management server 101 is connected with the one or more management clients 102 to communicate with each other via a communication line 104 and centrally manages data of the management clients 102, data of devices 103, and processes to be executed. The management server 101 may be realized by a single computer or may be realized by a plurality of computers. For example, the management server 101 may be configured by using a cloud service or the like.

The management client 102 directly executes processing for the one or more devices 103 via the communication line 104 and, for example, distributes a destination table to the devices 103.

Examples of the devices 103 are various network devices including a singlefunction peripheral (SFP) (printer), a multifunction peripheral (MFP), a web camera, a navigation system, and a network-connected home appliance.

Examples of the communication line 104 include various communication line networks, such as a local area network (LAN), a wide area network (WAN), a telephone line, a dedicated digital line, a network using asynchronous transfer mode (ATM), frame relay line, a cable television (TV) line, a wireless network for data broadcasting, and a cellular phone communication network.

<Inner Configuration of Management Server and Management Client>

Figure 2:
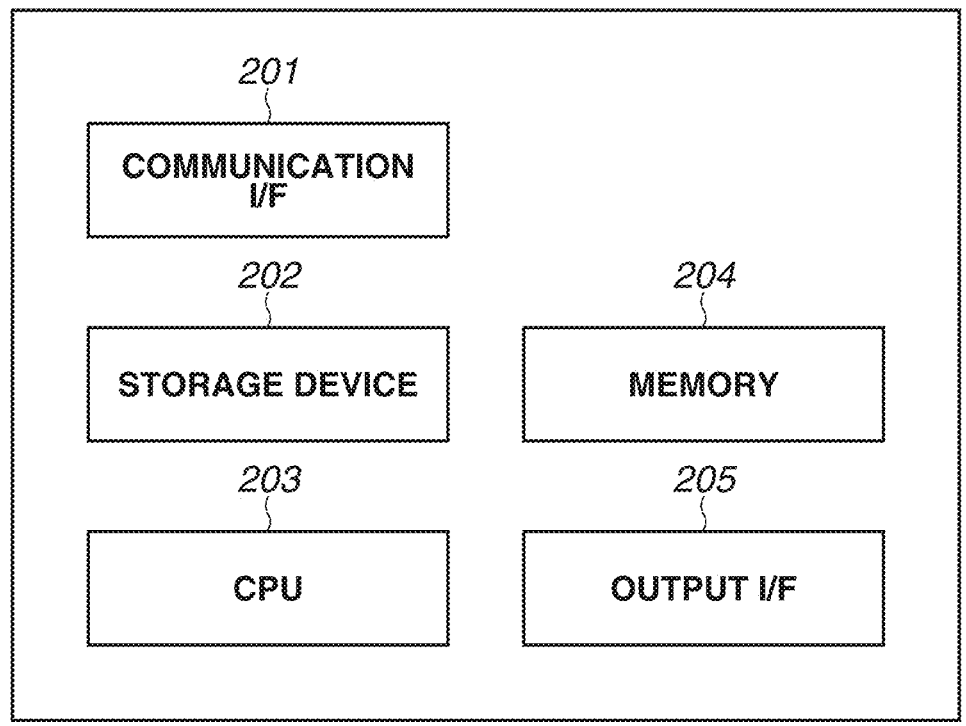
FIG. 2 is a block diagram illustrating an example of an inner configuration of a management server and a management client.

FIG. 2 is a block diagram illustrating an example of an inner configuration of the management server 101 and the management client 102.

The management server 101 and the management client 102 include a communication interface (I/F) 201, and a storage device 202, a central processing unit (CPU) 203, a memory 204, and an output I/F 205.

The communication I/F 201 is a network interface for performing communication with an external system or apparatus.

The storage device 202 is a nonvolatile memory in which an operating system (OS), a program, management data, data collected from an external system or apparatus, and the like are stored. The CPU 203 loads a program from the storage device 202 to the memory 204 and executes the program.

The output I/F 205 is an interface for connecting output devices, such as a display and outputting execution results of the program.

The device 103 includes a controller unit or the like having a configuration similar to that illustrated in FIG. 2.

<Function Configuration of Entire System>

Figure 3:
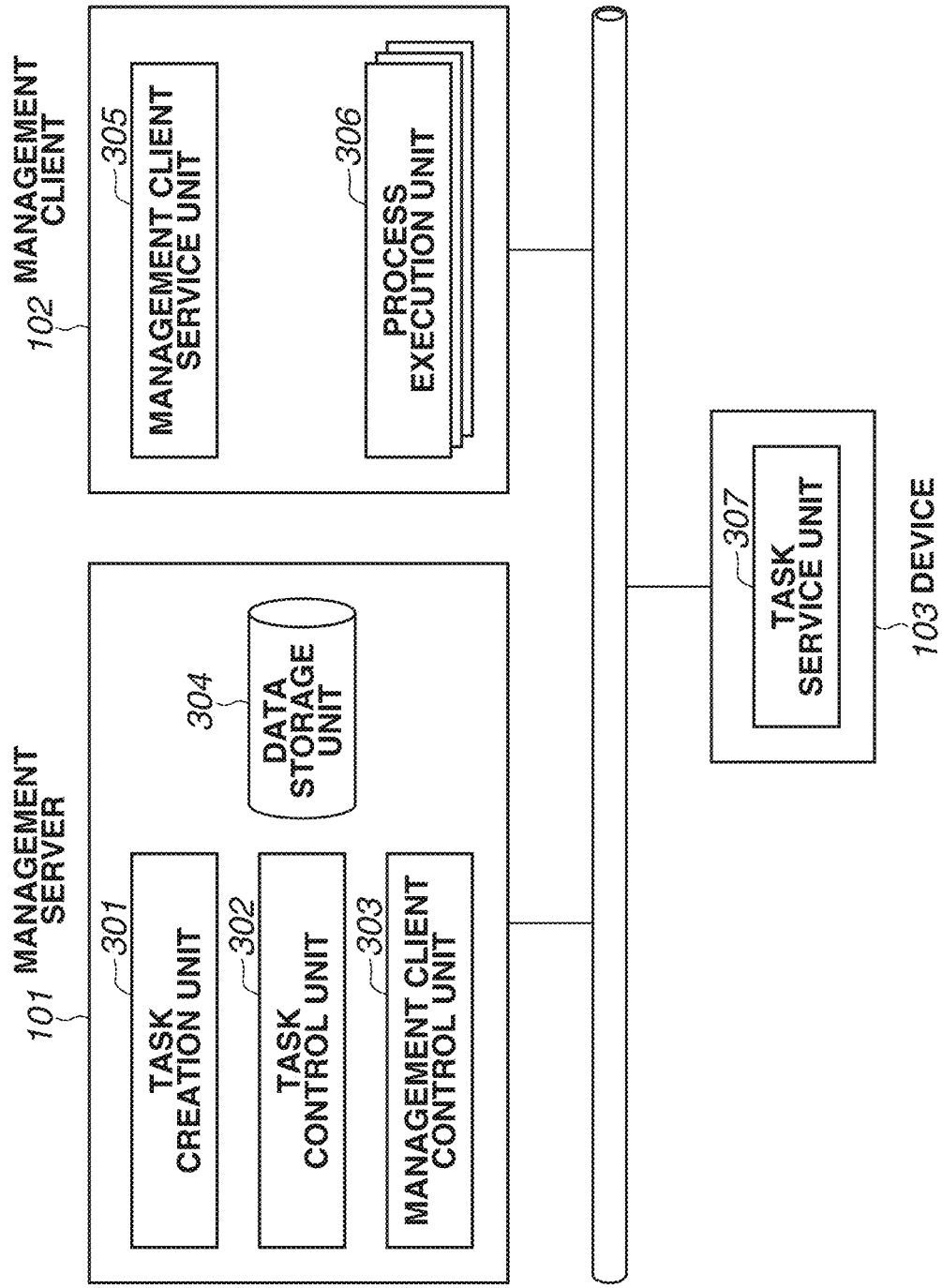
FIG. 3 is a block diagram illustrating an example of a function configuration of the entire system according to the present exemplary embodiment.

FIG. 3 is a block diagram illustrating an example of the function configuration of the entire system according to the present exemplary embodiment. The function of the management server 101 illustrated in FIG. 3 is realized by the CPU 203 of the management server 101 loading a program from the storage device 202 to the memory 204 and executing the program. The function of the management client 102 illustrated in FIG. 3 is realized by the CPU 203 of the management client 102 loading a program from the storage device 202 to the memory 204 and executing the program. The function of the device 103 illustrated in FIG. 3 is realized by the CPU 203 of the device 103 loading a program from the storage device 202 to the memory 204 and executing the program.

In the management server 101, a task creation unit 301 creates a task (hereinafter, referred to as a "schedule task") in which processing, set by a user, to be executed is defined. The created schedule task is managed by a data storage unit 304.

A task control unit 302 periodically refers to schedule task information managed by the data storage unit 304 and confirms whether there is a schedule task to be executed. If there is a schedule task to be executed, the task control unit 302 creates task information for execution and task information about a divided task (hereinafter referred to as "subtask") for processing of each device. The created various pieces of task information are managed in the data storage unit 304.

A management client control unit 303 periodically refers to the task information managed in the data storage unit 304 and performs task execution instruction for the management client 102. The management client control unit 303 responds to various requests from the management client 102. The management client control unit 303 receives a task execution result from the management client 102. The received task execution result is managed in the data storage unit 304.

The data storage unit 304 manages various data, such as task information, management target device information, and management client information.

In the management client 102, a management client service unit 305 receives the task execution instruction from the management server 101. After receipt of the task execution instruction, the management client service unit 305 acquires, from the management server 101, various pieces of task information about the task indicated by the task execution instruction. The management client service unit 305 analyzes the acquired various pieces of task information and creates subtasks to be executed.

Process execution units 306 execute subtasks to be executed and perform necessary processing for the device 103. Since the process execution units 306 operate on a plurality of threads, the process execution units 306 can execute a plurality of subtasks simultaneously (in parallel).

In the device 103, a task service unit 307 receives the task execution from the management client 102 and performs control. The task service unit 307 responds to the management client 102 with regard to a result of the received task.

<An Example of Schedule Task Creating Screen in Which Batch Processing is Defined>

Figure 4:
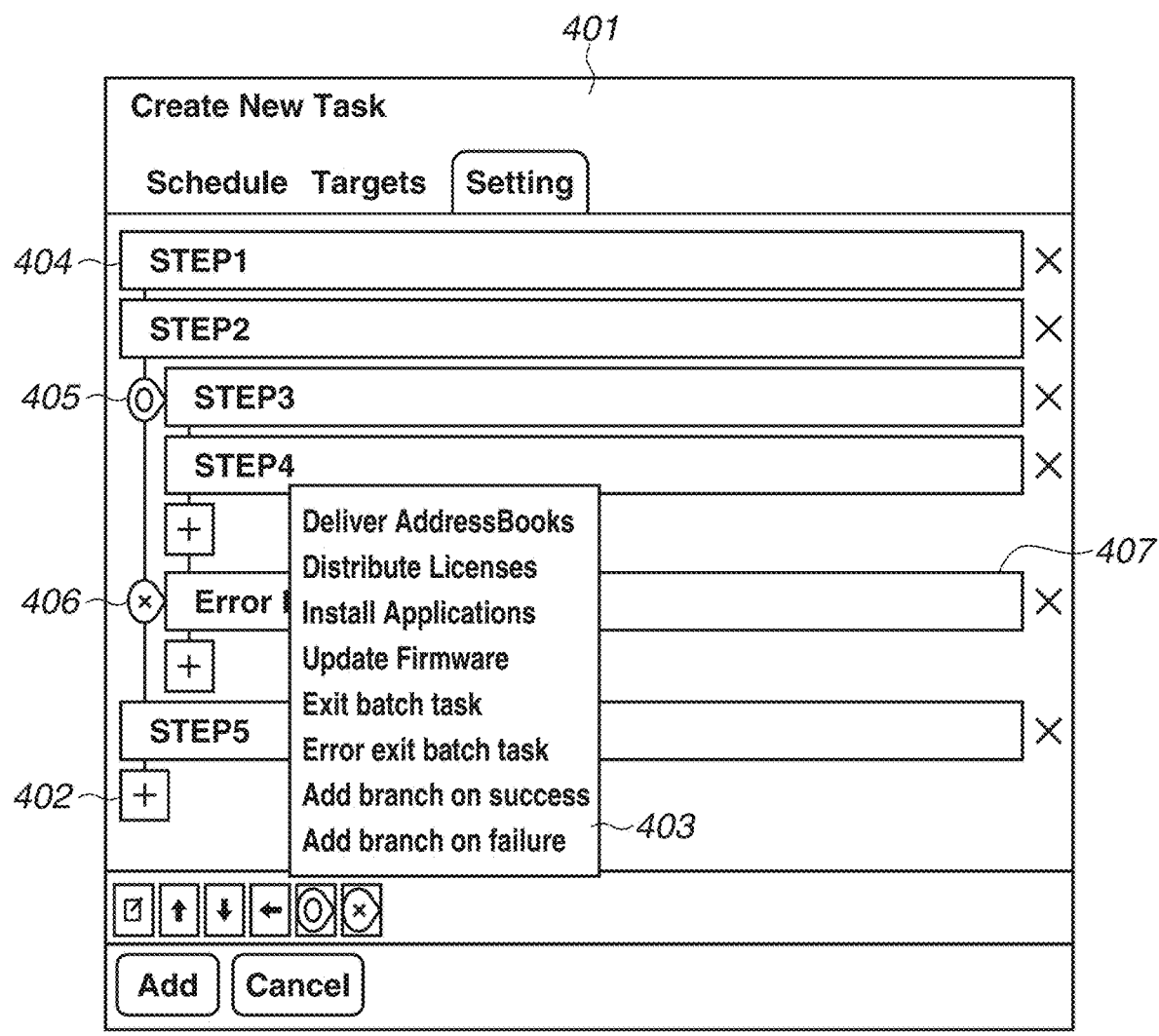
FIG. 4 is a diagram illustrating an example of a screen that creates a schedule task defining batch processing.

FIG. 4 is a diagram illustrating an example of a screen for creating a schedule task that defines batch processing.

The screen for creating a schedule task as illustrated in FIG. 4 is one of web screens provided by the management server 101 and is displayed on a web browser in response to access to the management server 101 from a web browser in a client's computer, for example.

A screen 401 has a setting tab for setting specific execution contents of batch processing. As illustrated in FIG. 4, the screen 401 also includes a screen of a schedule tab for setting execution schedule of a task and a screen of a targets tab for setting a target device in task execution.

A button 402 is used for adding a task to be executed (hereinafter, referred to as a "step task") defined in batch processing when a batch processing content is created.

A window 403 opens when the button 402 is pressed. In this window, a user can set a step task to be executed, add branch conditions (for example, a branch condition in a case of success and a branch condition in a case of failure), and set an end of batch processing and an execution result. In a case where a step task to be executed is selected in the window 403, a setting screen for the task is opened, and the user can perform a setting.

The screen 401 includes an added task 404. According to the present exemplary embodiment, a task "STEP1" is executed first.

A branch condition 405 indicates a case where a result of a previously processed task is successful. According to the present exemplary embodiment, in a case where a task "STEP2" is successful, a task "STEP3" is executed.

A branch condition 406 indicates a case where a result of a previously processed task is failed. According to the present exemplary embodiment, in a case where the task "STEP2" is failed, the entire processing for the batch processing is made to end as an error (Error Exit).

The screen 401 includes an Error Exit 407 indicating an end of batch processing and an execution result. According to the present exemplary embodiment, the Error Exit 407 indicates that an execution result of batch processing is failed and the batch processing is made to end (Error Exit).

Although details are not illustrated, in the above-described screen (Schedule tab) for setting the execution schedule of a task, a schedule (for example, execute at "10 o'clock every day") is set. These pieces of information are stored in the data storage unit 304 as schedule task information (details will be described with reference to FIG. 6). In the above-described screen (Targets tab) for setting a target device for task execution, a task execution target device is set. The information about the set device is stored as device information in the data storage unit 304 in association with the above-described schedule task information.

The batch task according to the present exemplary embodiment is used for processing one or more tasks in one or more devices all at once, and tasks of one or more stages are defined for the one or more devices. In the present exemplary embodiment, a batch task can be created using a graphical user interface (GUI) in which one or more tasks are connected with each other in a tree structure as illustrated in FIG. 4. With the GUI as illustrated in FIG. 4, execution of a task at a next stage can be defined in accordance with a result of a task at a previous stage.

In the present exemplary embodiment, the management server 101 provides the user interface as illustrated in FIG. 4 as a web screen and a batch task according to the present exemplary embodiment is defined and created using the user interface. The user interface as illustrated in FIG. 4 may be provided in other information processing apparatus, such as the management client 102, and a batch task according to the present exemplary embodiment may be created. In this case, the created batch task is transmitted to the management server 101 and is registered into the data storage unit 304.

<Task Execution Operation Processing of Management Server in First Exemplary Embodiment>

Figure 5:
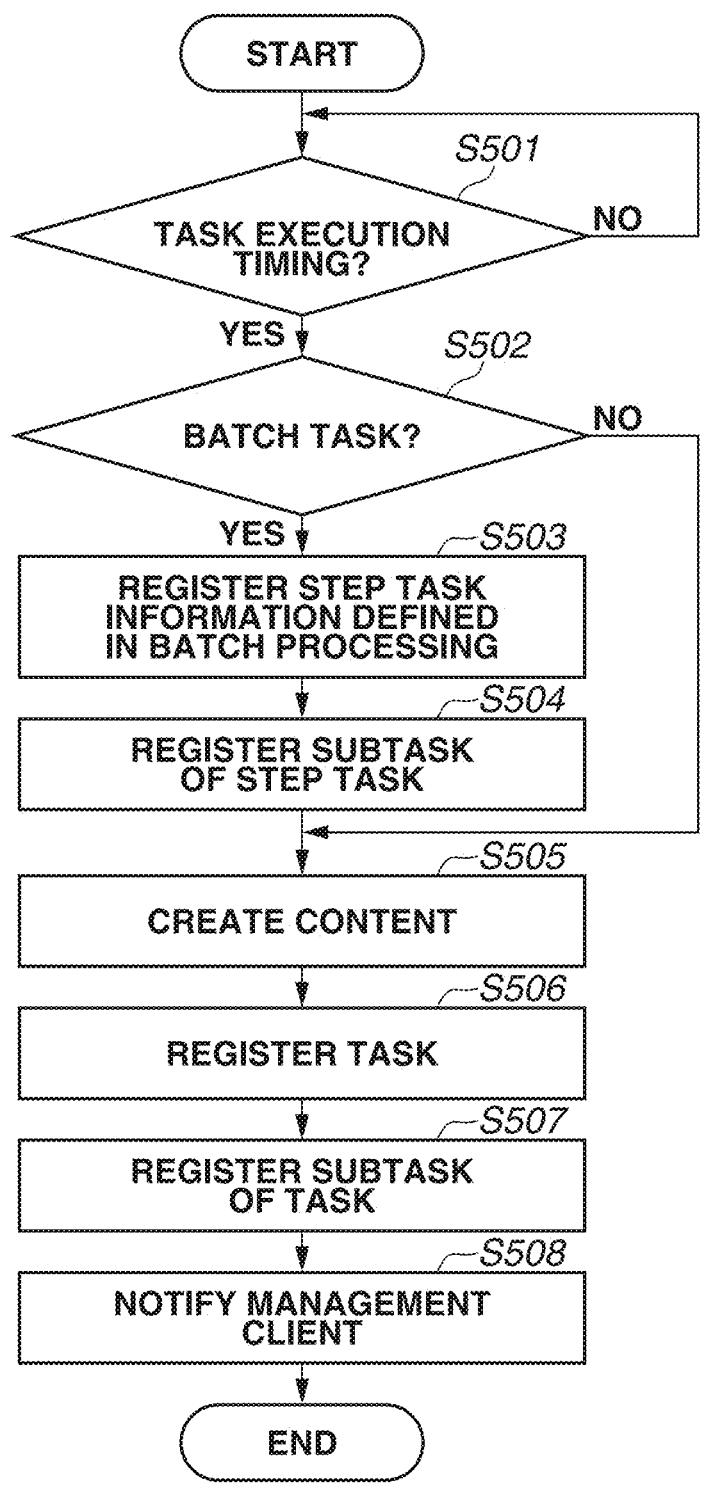
FIG. 5 is a flowchart illustrating an example of task execution operation processing of the management server.

FIG. 5 is a flowchart illustrating an example of the task execution operation processing by the management server 101 according to the present exemplary embodiment. The processing of the flowcharts illustrated in FIG. 5 and FIG. 11 described below is executed by a function that is realized by the CPU 203 of the management server 101 loading a program from the storage device 202 to the memory 204 and executing the program.

In step S501, the task control unit 302 periodically refers to schedule task information stored in the data storage unit 304 and checks whether there is a schedule task to be executed at this point in time (whether a task execution timing comes). In a case where the task control unit 302 determines that there is no schedule task to be executed (i.e., not a task execution timing, NO in step S501), the task control unit 302 continues to periodically refer to schedule task information.

Meanwhile, in a case where there is a schedule task to be executed (i.e., at a task execution timing, YES in step S501), the processing proceeds to step S502.

The schedule task information is described with reference to FIG. 6.

FIG. 6 is a diagram illustrating an example of a table in which the schedule task information is registered.

In FIG. 6, an item "Task ID" is information for identifying a schedule task.

An item "Task type" is information indicating a type of a schedule task. To the schedule task in which batch processing is defined, information indicating a "batch task" is registered.

An item "Task name" is information indicating a name of a schedule task.

An item "Schedule" is information indicating an execution schedule of a schedule task. Examples of the execution schedule information include "every day at 10 o'clock" and "the first day of every month".

An item "Next execution date and time" is information indicating a next execution date and time of a schedule task. As this information, a next execution date and time is calculated in accordance with a setting of a schedule at a timing of when a schedule task is registered or at a timing of when the schedule task is executed.

An item "Content" is information indicating detailed information about a schedule task. For example, in a case of a schedule task (a task type is a "batch task") that defines batch processing, information indicating a batch processing content is stored. An example of specific data of the content is shown in content information 601 in FIG. 6.

The content information 601 is an example of the content information about the schedule task that defines batch processing. The content information includes a definition of how to execute a plurality of step tasks in which order and at a timing of which condition. The content information 601 manages information about batch processing that includes four items of "task", "succeed", "failed", and "unit Type", for each step task.

In an item of "task", step task information to be executed is stored.

An item of "succeed" defines a list of processing information about a subsequent step task to be executed in a case where the "task" is successful.

An item of "failed" defines a list of processing information about a subsequent step task to be executed in a case where the "task" is failed.

An item of "unit Type" defines a type ("Task", "Exit", "Error Exit") of the "task" of a processing target. Hereinafter, each type will be described.

"Task": task to be processed (for example, a task corresponds to "STEP1" to "STEP5" in FIG. 4)

"Exit": a result of batch processing is determined as being successful, and the batch processing is ended.

"Error Exit": a result of batch processing is determined as failed, and the batch processing is ended (for example, the Error Exit 407 in FIG. 4).

According to the present exemplary embodiment, processing is performed sequentially from a step task at the top of the list. In a case where subsequent step tasks are defined in the items of "succeed" and "failed" among the step tasks, the defined subsequent step tasks will be processed sequentially according to an execution result of the "task". For example, "STEP2" in FIG. 4 corresponds to a case where STEP3 and STEP4 are defined as a list of "succeed" (branch condition 405). Accordingly, in a case where STEP2 is successful, STEP3 and STEP4 will be executed. The example case in FIG. 4 corresponds to a case where the Error Exit 407 is defined as a list of "failed" (branch condition 406). Accordingly, in a case where STEP2 is failed, the Error Exit 407 will be executed.

Hereinafter, the description returns to the flowchart in FIG. 5.

In step S502, the task control unit 302 determines whether a schedule task to be executed at this point in time is a schedule task that defines batch processing (task type is a "batch task").

In step S502, in a case where the task control unit 302 determines that the schedule task is not a schedule task that defines batch processing (i.e., task type is not a "batch task", NO in step S502), the processing proceeds to step S505. The processing from step S505 onward will be described below.

Meanwhile, in a case where the task control unit 302 determines that the schedule task is a schedule task that defines batch processing (i.e., task type is a "batch task", YES in step S502), the processing proceeds to step S503.

In step S503, the task control unit 302 registers the step task information defined in the batch processing in the data storage unit 304. Examples of task information to be stored and managed in the data storage unit 304 include content information indicating detailed information on task ID and a task, a processing result, and the like.

In step S504, the task control unit 302 registers subtasks of each step task into the data storage unit 304.

"Subtasks of a step task" are tasks (subtasks) obtained by dividing a task (step task), which is defined in batch processing and is to be executed, for processing in each device. Examples of subtask information on a step task to be stored and managed in the data storage unit 304 include subtask ID and related task ID, management client ID of an instruction target, device ID of a task execution target, content information containing detailed information, processing results, and the like. As described above, a device of a task execution target is set at the timing of creating a schedule task and is managed in association with task information and device information in the data storage unit 304. A management client of an instruction target sets beforehand which device is managed by which management client, and manages the associated information in the data storage unit 304. Based on the associated information, the task control unit 302 creates subtasks.

After the processing of step S504, the processing is proceeds to S505 by the task control unit 302.

In step S505, the task control unit 302 creates the content information indicating detailed information on a task. The content information in the batch processing indicates a definition of how to execute a plurality of step tasks in which order and at a timing of which condition. The content information in the batch processing is described with reference to FIG. 7.

FIG. 7 is a diagram illustrating an example of the content information in the batch processing.

In an example of the content information illustrated in FIG. 7, information related to the batch processing including four items of "unit Type", "task Id", "succeed", and "failed" are managed. The basic configuration is substantially similar to that shown in the content information 601. A different point between the content information in FIG. 7 and the content information 601 is that "task" shown in the content information 601 is replaced with "task Id". In the item of "task Id", only identification information about the step task created in the processing of step S503 is stored.

The description returns to the flowchart in FIG. 5.

In step S506, the task control unit 302 creates batch processing to be executed as a task (hereinafter, referred to as a "batch task") and registers the batch task in the data storage unit 304. The batch task information stored and managed in the data storage unit 304 is as described above in the processing of step S503. The content information corresponds to the content information created in the processing of step S505.

In step S507, the task control unit 302 creates the subtasks of the task to be executed (here, batch task) and registers the subtasks in the data storage unit 304. The subtask information on the batch task stored and managed in the data storage unit 304 is as described above in the processing of step S504.

"Subtasks of a batch task" are tasks (subtask) obtained by dividing a task (batch task) for executing the batch processing for processing in each device.

In step S508, the management client control unit 303 issues task execution instruction to the management client 102 as an instruction target. In response to the task execution instruction, the management client 102 executes a task to a target device.

<Task Execution Operation Processing of Management Client in First Exemplary Embodiment>

FIG. 8 is a flowchart illustrating an example of the task execution operation processing by the management client 102 according to the present exemplary embodiment. The processing procedure in the flowchart illustrated in FIG. 8 and FIGS. 9 and 10 described below is executed by a function that is realized by the CPU 203 of the management client 102 loading a program from the storage device 202 to the memory 204 and executing the program.

In this flowchart, a task to be executed is a batch task.

In step S801, the management client service unit 305 monitors whether a task execution instruction has been received from the management server 101. In a case where the management client service unit 305 determines that a task execution instruction has not been received (NO in step S801), the management client service unit 305 continues to wait for reception of the task execution instruction.

Meanwhile, in a case where the management client service unit 305 determines that a task execution instruction has been received from the management server 101 (YES in step S801), the processing proceeds to step S802.

In step S802, the management client service unit 305 requests the management client control unit 303 of the management server 101 to transmit batch task information corresponding to the received task execution instruction, and acquires the batch task information.

In step S803, the management client service unit 305 requests the management client control unit 303 of the management server 101 to transmit the subtask information on the batch task corresponding to the received task execution instruction, and acquires the subtask information.

In step S804, the management client service unit 305 requests the management client control unit 303 to transmit task information on a step task based on the task ID of each step task included in the content information about the batch task information acquired in step S802, and acquires the task information. Further, the management client service unit 305 creates a step task list based on the acquired task information on the step task.

In step S805, the management client service unit 305 requests the management client control unit 303 to transmit subtask information on a step task associated with the task ID of each step task based on the task ID of each step task included in the content information about the batch task information acquired in step S802, and acquires the subtask information. In other words, the subtask information for each step task is acquired.

In step S806, the management client service unit 305 creates an association list between a target device and a subtask of a step task for each step task based on the information acquired in steps S804, S805, and the like. That is, a task (step task) at each stage defined by the batch task, for which execution instruction has been issued, is divided into a subtask for each device as an execution target.

In step S807, the management client service unit 305 registers the subtasks of the batch task into a processing queue, to cause the process execution units 306 to execute the task.

In step S808, each of the process execution units 306 sequentially acquires the subtasks of the batch task in the processing queue and executes the subtasks (subtask execution processing), and the processing of this flowchart ends. The details of the processing (subtask execution processing)

executed by each of the process execution units 306 are described with reference to FIG. 9.

Figure 9:
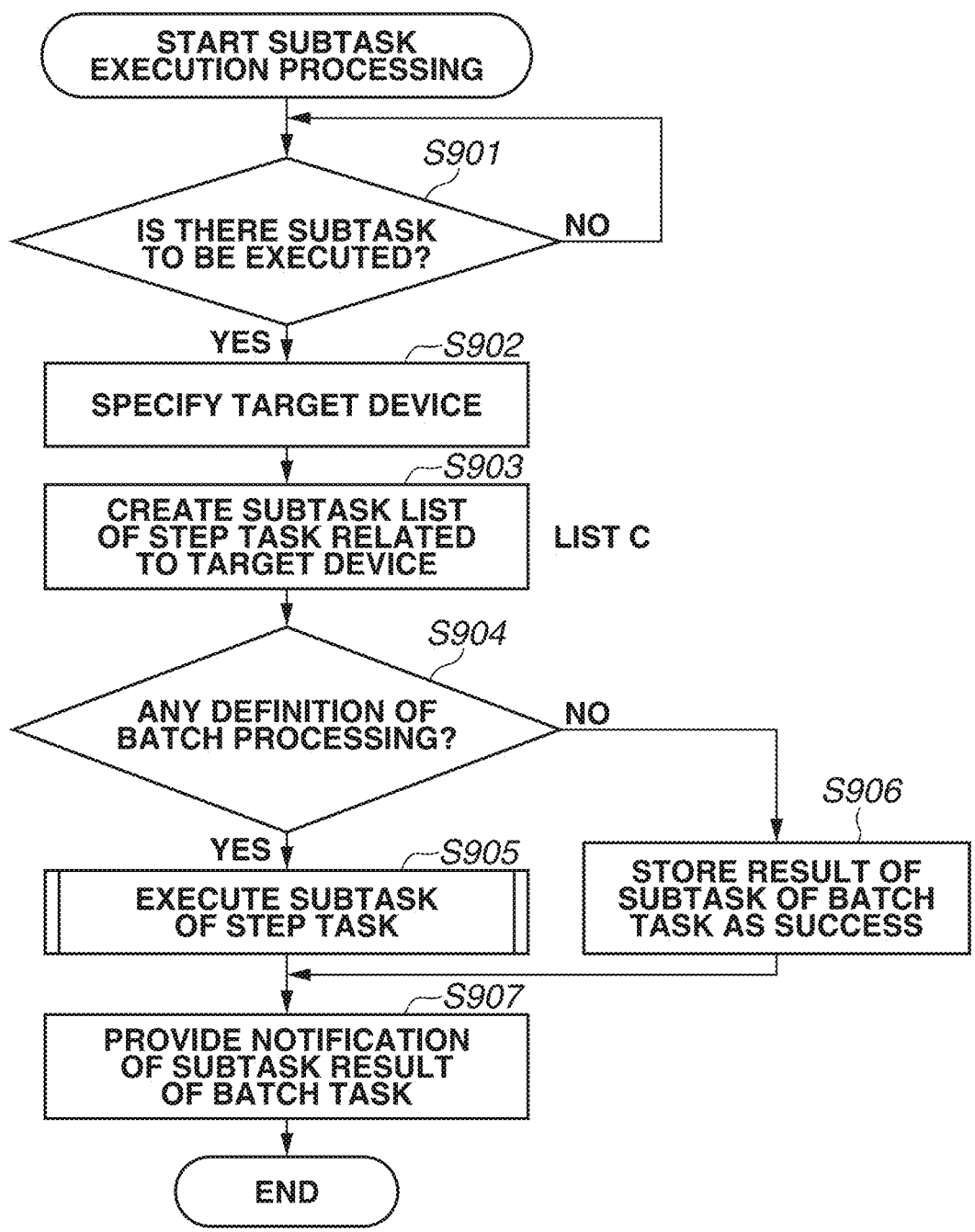
FIG. 9 is a flowchart illustrating an example of subtask execution processing of a batch task that is executed by each process execution unit of management clients.

FIG. 9 is a flowchart illustrating an example of the subtask execution processing (corresponding to step S808 in FIG. 8) of the batch task that is executed by each of the process execution units 306 of the management client 102 according to the present exemplary embodiment.

In step S901, the process execution unit 306 acquires a subtask from the processing queue. The subtask acquired in this step is a subtask of a batch task.

In a case where a subtask is not acquired (i.e., there is no subtask to be executed, NO in step S901), the process execution unit 306 continues acquiring a subtask from the processing queue.

Meanwhile, in a case where a subtask is acquired (i.e., there is a subtask to be executed, YES in step S901), the processing proceeds to step S902.

In step S902, the process execution unit 306 specifies a target device for processing based on information about the subtask acquired in step S901, and the processing proceeds to step S903.

In step S903, the process execution unit 306 creates a subtask list of a step task related to a target device for the processing at this time from the association list, which is created in step S806 in FIG. 8, indicating association between a target device and a subtask of the step task for each step task.

In step S904, the process execution unit 306 checks whether there is the content information of the task information acquired by the management client service unit 305 in the processing of step S802 in FIG. 8 (definition of batch processing). In a case where there is the content information (i.e., there is definition of batch processing, YES in step S904), the processing proceeds to step S905.

In step S905, the process execution unit 306 performs the subtask execution processing of the step task based on the subtask list of the step task created in step S903, and the processing proceeds to step S907. The details (subtask execution operation processing of a step task) of the processing in step S905 are described with reference to FIG. 10 described below.

Meanwhile, in step S904, in a case where there is not the content information (i.e., there is no definition of batch processing, NO in step S904), the processing proceeds to step S906.

In step S906, the process execution unit 306 manages a subtask result of the batch task as "succeed" and the processing proceeds to step S907.

In step S907, the process execution unit 306 notifies the subtask result of the batch task to the management client control unit 303 of the management server 101, and the processing procedure of this flowchart ends.

Figure 10:
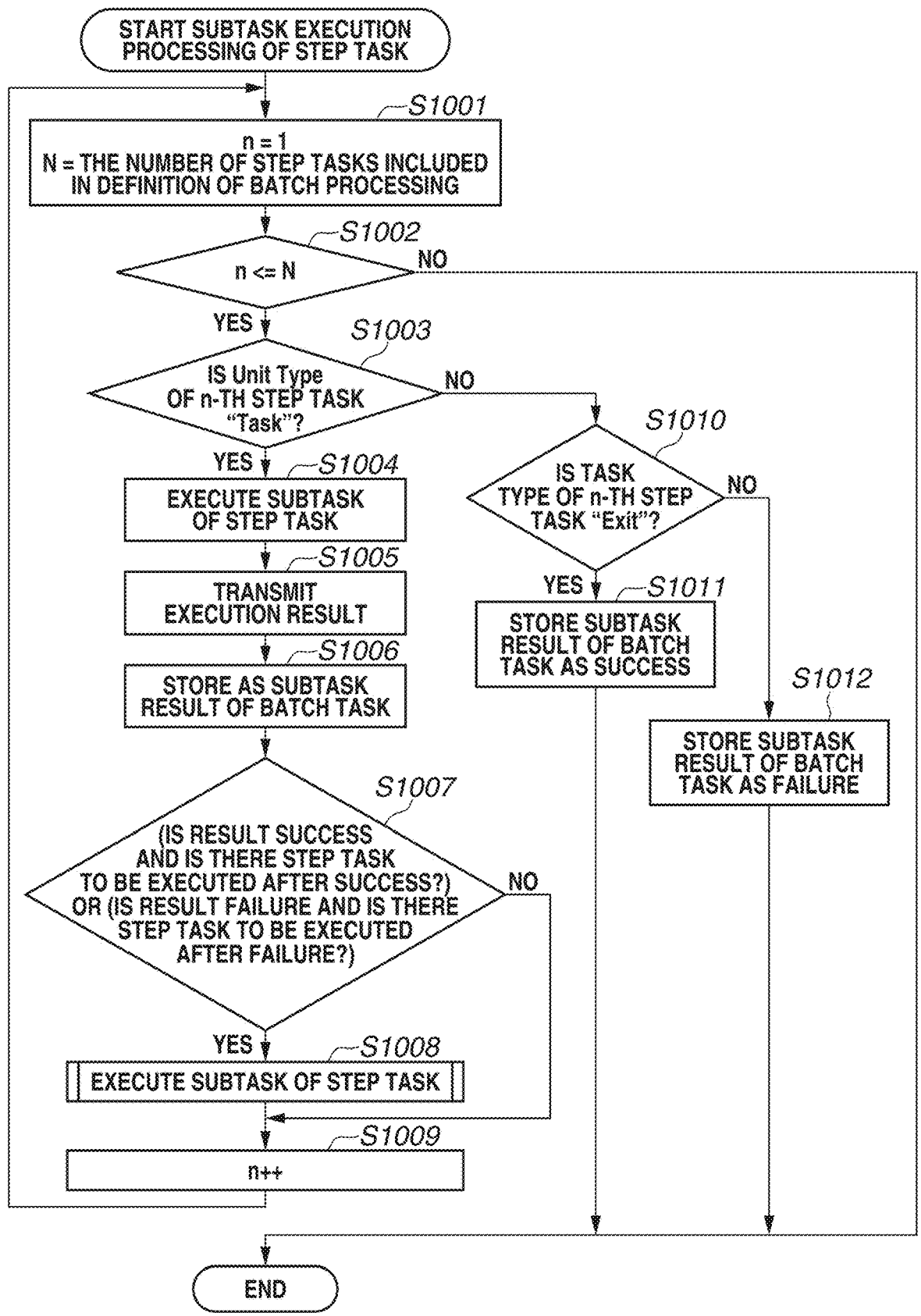
FIG. 10 is a flowchart illustrating an example of subtask execution processing of a step task that is executed by each process execution unit of management clients.

FIG. 10 is a flowchart illustrating an example of the subtask execution processing (corresponding to step S905 in FIG. 9) of the step task that is executed by each of the process execution units 306 of the management clients 102 according to the present exemplary embodiment.

In step S1001, the process execution unit 306 performs initialization processing. First, in the initialization processing, the process execution unit 306 acquires the number (variable N) of the step tasks included in the definition of the batch processing to be processed at this point in time and holds it. This number does not include the number of step tasks to be executed according to the processing result defined in each step task. Next, the process execution unit 306 sets information (variable n) indicating whether to process a step task of what number in the definition of the batch processing, to 1.

In step S1002, the process execution unit 306 checks whether a step task (n-th step task) to be processed is in the definition of the batch processing (n≤N). In a case where there is a step task to be processed (i.e., n≤N, YES in step S1002), the processing proceeds to step S1003.

In step S1003, the process execution unit 306 checks whether "Unit Type" of the step task (n-th step task) of a processing target is "Task". In a case where "Unit Type" is "Task" (YES in step S1003), the processing proceeds to step S1004.

In step S1004, the process execution unit 306 acquires subtasks of the step task of a processing target from the subtask list, created in the processing of step S903 in FIG. 9, of the step task related to the target device (from the list of "succeed" or "failed" specified when a recursive call is performed in step S1008 described below) and executes the subtasks.

In step S1005, the process execution unit 306 notifies a result of the subtask of the target step task executed in step S1004 to the management client control unit 303 of the management server 101.

In step S1006, the process execution unit 306 stores the result of the subtask of the target step task executed in step S1004 as the result of the subtask of the batch task.

In step S1007, the process execution unit 306 controls changing of processing based on the following conditions.

In step S1007, in a case where the processing result of step S1004 is successful and there is a step task to be executed if the processing result is successful (YES in step S1007), the processing proceeds to step S1008. Determination of whether there is a step task to be executed if the processing result is successful is made based on determination of whether a list of processing information about a subsequent step task is defined in the item of "succeed" of the target step task.

Further, in step S1007, in a case where the processing result of step S1004 is failed and there is a step task to be executed if the processing result is failed (YES in step S1007), the processing also proceeds to step S1008. Determination of whether there is a step task to be executed if the processing result is failed is made based on determination of whether a list of processing information about a subsequent step task is defined in the item of "failed" of the target step task.

Meanwhile, in a case of not meeting any of the above-described two conditions (NO in step S1007), the processing proceeds to step S1009.

In step S1008, the process execution unit 306 performs the subtask execution processing of the step task based on the list of processing information about the subsequent step task to be processed in the processing of step S1007. That is, the process execution unit 306 executes the processing of this flowchart based on (by specifying) the list of the above-described "succeed" or "failed" (recursive call). With this configuration, nested processing listed in the item of "succeed" or "failed" in the processing of step S1004, is also executed.

In step S1009, the process execution unit 306 increments the value of the variable n, and the processing returns to step S1001, and the processing transits to the subsequent step task.

In step S1002, in a case where there is not a step task (n-th step task) to be processed in the definition of the batch processing (i.e., n>N, NO in step S1002), the processing of this flowchart ends.

In step S1003, in a case where "Unit Type" is not "Task" (NO in step S1003), the processing proceeds to step S1010.

In step S1010, the process execution unit 306 checks whether "Unit Type" of the step task (n-th step task) of a processing target is "Exit". In a case where "Unit Type" is "Exit" (YES in step S1010), processing proceeds to step S1011.

In step S1011, the process execution unit 306 stores a result of the subtask of the batch task as "succeed", and the processing of this flowchart ends.

Meanwhile, in step S1010, in a case where "Unit Type" is not "Exit" (NO in step S1010), the processing proceeds to step S1012.

In step S1012, the process execution unit 306 stores the result of the subtask of the batch task as "failed", and the processing of this flowchart ends.

<Task Execution Result Update Processing of Management Server in First Exemplary Embodiment>

Figure 11:
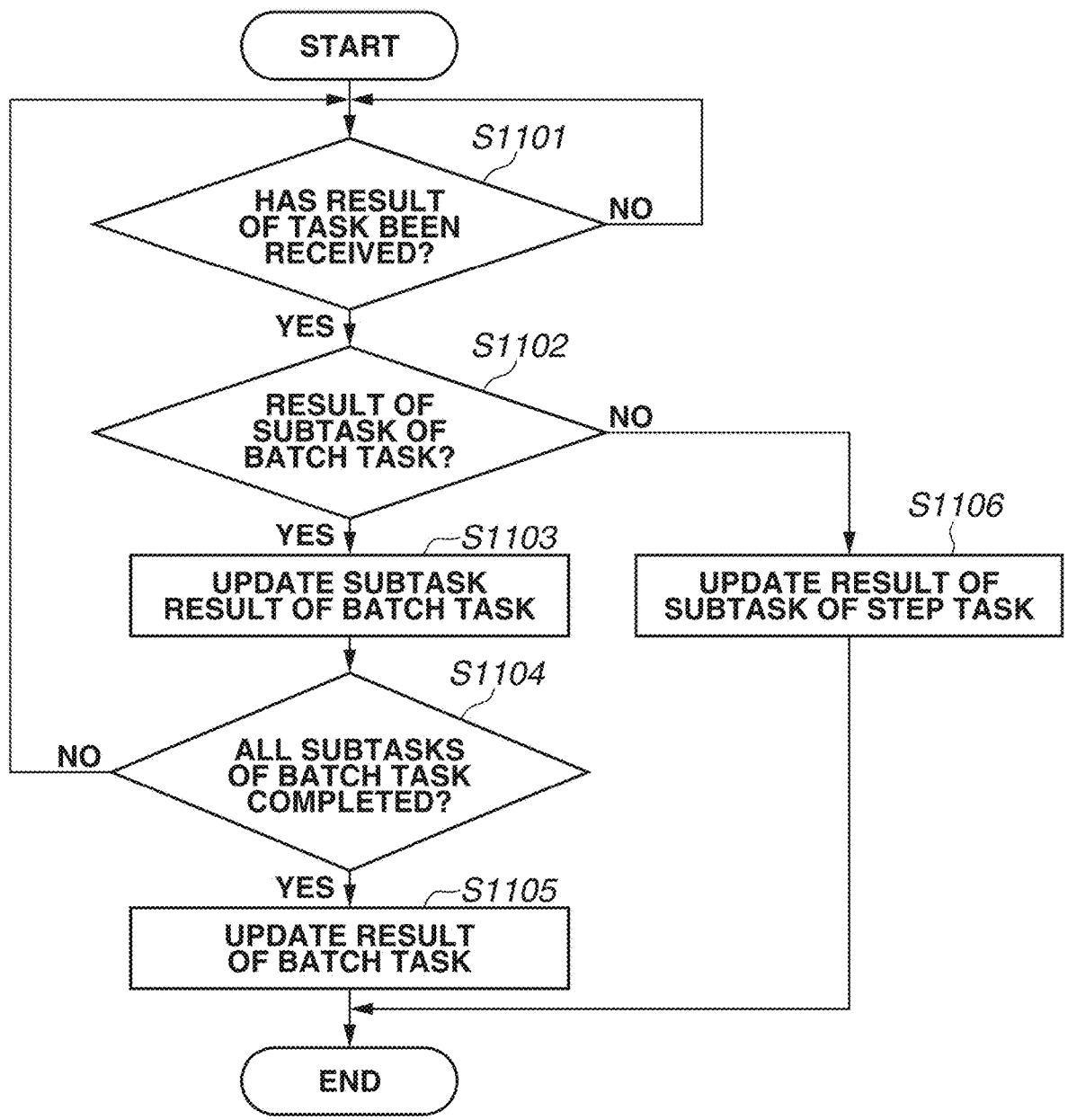
FIG. 11 is a flowchart illustrating an example of task execution result update processing by a management server.

FIG. 11 is a flowchart illustrating an example of the task execution result update processing of the management server 101 according to the present exemplary embodiment.

In step S1101, the management client control unit 303 monitors whether a result of the task is received from the management client 102. In a case where a result of the task is not received (NO in step S1101), the management client control unit 303 waits until receiving a result of the task.

Meanwhile, in a case where a result of the task is received (YES in step S1101), the processing proceeds to step S1102.

In step S1102, the management client control unit 303 determines whether the received result of the task is a result of the subtask of the batch task. In a case where the management client control unit 303 determines that the received result of the task is a result of the subtask of the batch task (YES in step S1102), the processing proceeds to step S1103.

In step S1103, the management client control unit 303 stores the subtask result of the batch task in the data storage unit 304 (i.e., updates the subtask result of the batch task).

In step S1104, the management client control unit 303 determines whether processing for all the subtasks of the batch task is completed, by checking subtask results associated with the batch task managed by the data storage unit 304. In a case where processing for all the subtasks is completed (NO in step S1104), the processing returns to step S1101 and the management client control unit 303 waits until receiving a result of the task.

Meanwhile, in a case where processing for all the subtasks is completed (YES in step S1104), the processing proceeds to step S1105.

In step S1105, the management client control unit 303 stores the result of the batch task in the data storage unit 304 (the subtask results of the batch task is updated), and the processing procedure of this flowchart ends.

Meanwhile, in step S1102, in a case where the received result of the task is not a result of the subtask of the batch task (NO in step S1102), the processing proceeds to step S1106.

In step S1106, the management client control unit 303 stores the subtask result of the step task in the data storage unit 304 (the subtask result of the step task is updated), and the processing of this flowchart ends.

<An Example of Task Result Display by Management Server in First Exemplary Embodiment>

Figure 14:
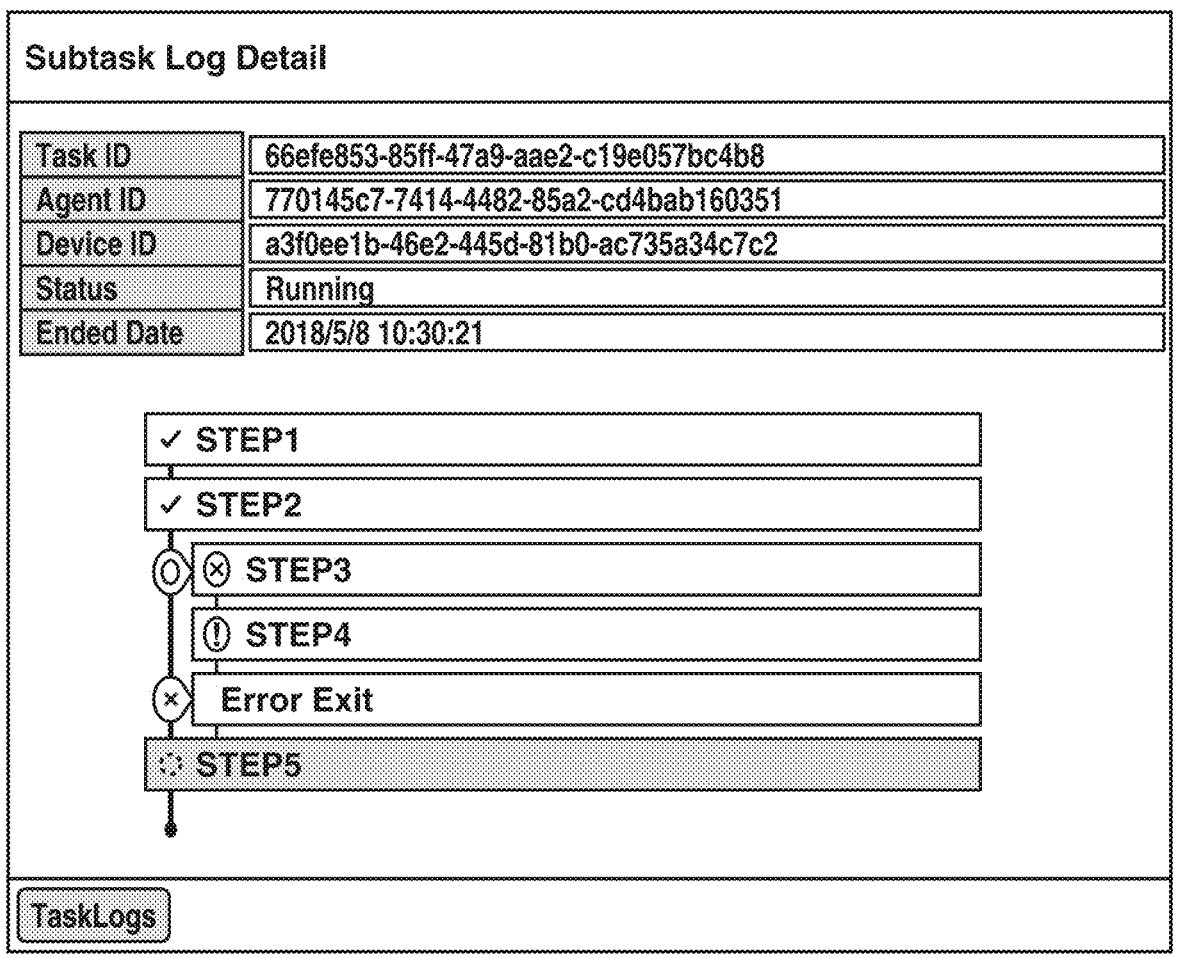
FIG. 14 is a diagram illustrating an example of a screen indicating results of a task in a device of the management server according to the present exemplary embodiment.

With reference to FIGS. 12, 13, and 14, an example of task result display screens of the management server 101 according to the present exemplary embodiment is illustrated. The task result display screens are displayed based on the results of subtasks transmitted from the management client 102.

FIG. 12 is a diagram illustrating an example of a task result screen.

In this screen, execution results of tasks are displayed in a list.

An item "Name" represents information indicating a task name.

An item "Type" represents information to indicating a task type.

An item "Status" represents information indicating a task execution result. Upon clicking the information, the screen transits to a screen showing details of the task result. The screen showing details of the task result is illustrated in FIG. 13.

An item "Task ID" represents information for identifying a task.

An item "Ended Date" represents information indicating a completion date and time of a task.

As described above, the management server 101 can display an execution result of each task as illustrated in FIG. 12 in response to a request from a web browser or the like that operates on a client computer.

FIG. 13 is a diagram illustrating an example of a screen showing details of a task result.

In the screen, an execution result of a task for each target device is displayed in a list.

An item "Device Name" represents information indicating a device name as an execution target of a task.

An item "Location" represents information indicating location information on a device.

An item "Status" represents information indicating a task execution result. Upon clicking the information, the screen transits to a screen showing details of a task result in the device. The screen showing details of a task result in the device is illustrated in FIG. 14.

An item "Ended Date" represents information indicating a completion date and time of a task in the device.

As described above, the management server 101 can display details of an execution result of each task as illustrated in FIG. 13 in response to a request from the web browser or the like that operates on a client computer.

FIG. 14 is a diagram illustrating an example of the screen showing details of a task result.

In the screen, the execution result in a batch task is displayed.

At an upper part of the screen, detailed information on a task is shown.

An item "Task ID" represents information for identifying a task.

An item "Agent ID" represents information for identifying a management client which has executed a task.

An item "Device ID" represents information for identifying a device as an execution target of a task.

An item "Status" represents information indicating a task execution result.

An item "Ended Date" represents information indicating a completion date and time of a task in the device.

At a lower part of the screen, an execution result of each step task of a batch task is shown.

The result for each step task is shown using an icon. For example, a check mark represents success. An X mark ("x") represents failure. An exclamation mark ("!") represents timeout. In a case where there is a task in progress, an icon that represents such situation is displayed. In order to show a result intuitively, results may be indicated by color. Other display modes may be employed to realize a display mode with which an execution result and an execution status of each step task of a batch task are displayed in a recognizable manner.

As described above, the management server 101 can display details of a task result in the device as illustrated in FIG. 14 in response to a request from the web browser or the like that operates on a client computer.

As described above, according to the first exemplary embodiment, in the batch task processing in which a plurality of tasks are connected with each other to be executed, tasks are configured to be executed in respective target devices. More specifically, while the definition itself of a batch task defines tasks of one or more stages for one or more devices, a management client that actually executes a task divides the task among the one or more devices and to cause the one or more devices to perform batch processing in parallel. With the configuration, a batch task can be performed efficiently regardless of processing results in other devices.

According to the above-described first exemplary embodiment, a target device is selected when a batch task is created. In such a case, the target device for each step task defined in the batch task is the same. However, a device to be used for execution of a step task may be different depending on a content of each step task. Therefore, according to the second exemplary embodiment, a target device is selected for each step task.

As described above, according to the second exemplary embodiment, a device to be used for execution of a step task may be made different depending on a content of the step task among the same batch tasks.

According to the first exemplary embodiment, a schedule for executing a batch task is selected when a batch task is created. In such a case, an execution schedule for each step task defined in the batch task is the same. However, a schedule or frequency of a step task may be different depending on a content of each step task. Therefore, according to the third exemplary embodiment, a schedule may be configured to be selected for each step task.

As described above, according to the third exemplary embodiment, an execution schedule of a step task may be made different among the same batch tasks according to a content of each step task.

The configuration according to the second exemplary embodiment and the configuration according to the third exemplary embodiment may be combined with each other.

As described above, according to the present exemplary embodiment, the definition itself of a batch task defines processing of one or more stages for one or more devices. However, a management client that actually executes a task divides the batch task among one or more devices and to cause the one or more devices to perform batch processing in parallel.

With such a configuration, in the batch task processing in which a plurality of tasks are connected with each other to be executed, the tasks can be executed in each target device, and thus a batch task can be executed efficiently regardless of processing results of other devices.

For example, even in a case where a task at a previous stage has been failed in some devices, a subsequent task can be executed in devices that have been successful in the previous stage if there are devices in which the task at the previous stage has been successful. Further, even in a case where previous stage processing is delayed in some devices, an influence on a processing speed to all the devices as targets of a batch task can be reduced or prevented.

Therefore, a batch task for a plurality of network devices can be executed efficiently regardless of a processing result of each network device as a processing target.

The configuration of the above-described various data and their contents are not limited to this and may be configured with various configurations and contents according to a use or a purpose.

While exemplary embodiments have been described above, for example, it is possible for the present disclosure to take an exemplary embodiment as a system, apparatus, method, program, or memory medium. In concrete terms, the present disclosure may be applied to a system that includes a plurality of devices or may be applied to an apparatus that includes one device.

All the configurations in which the above-described respective exemplary embodiments are combined, are also included in the present disclosure.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-239398, filed Dec. 21, 2018, which is hereby incorporated by reference herein in its entirety.

What is claimed is:

1. An information processing apparatus that communicates with a network device via a network, the information processing apparatus comprising:
   at least one memory storing instructions; and
   at least one processor executing the instructions causing the information processing apparatus to:
   receive an execution instruction of a batch task in which step tasks for respective stages are defined for network devices as execution targets;
   register subtasks for the respective network devices as the execution targets, on a basis of information about the batch task corresponding to the received execution instruction,
   wherein one subtask defines one network device in the execution targets and same tasks as the step tasks included in the batch task, and the step tasks include a step task for distributing data to the network device; and
   execute the registered subtasks to distribute the data to the network devices as the execution targets.

2. The information processing apparatus according to claim 1, wherein the subtasks for the respective network devices as the execution targets are executed in an order based on the information about the batch task.

3. The information processing apparatus according to claim 1, wherein the batch task is defined using a user interface in which the step tasks can be connected with each other in a tree structure.

4. The information processing apparatus according to claim 3, wherein the batch task is further defined using the user interface to execute a step task of a next stage, according to a result of a step task of a previous stage.

5. The information processing apparatus according to claim 1, wherein in the batch task, a network device as an execution target is defined for each step task of different stages.

6. The information processing apparatus according to claim 1, wherein in the batch task, an execution schedule is defined for each step task of different stages.

7. The information processing apparatus according to claim 1,
   wherein the execution instruction of the batch task is received from a management apparatus that manages the batch task, and
   wherein the instructions further cause the information processing apparatus to notify the management apparatus of an execution result of the subtasks.

8. The information processing apparatus according to claim 1, wherein, according to an execution of the subtasks, at least one of address book data, license data, application data and firmware data is distributed to the execution targets.

9. A management system, comprising:
   an information processing apparatus that communicates with a network device via a network;
   and a management apparatus,
   wherein the information processing apparatus comprises at least one memory storing instructions and at least one processor executing the instructions causing the information processing apparatus to:
   acquire information about a batch task corresponding to an execution instruction from the management apparatus, wherein the batch task defines step tasks for respective stages for network devices as execution targets;
   register subtasks for respective network devices as the execution targets, on a basis of the information about the batch task;
   wherein one subtask defines one network device in the execution targets and same tasks as the step tasks included in the batch task, and the step tasks include a step task for distributing data to the network device;
   execute the registered subtasks to distribute the data to the network devices as the execution targets; and
   notify the management apparatus of an execution result of the subtasks, and
   wherein the management apparatus displays an execution result of the batch task for each of the network devices as the execution targets, on a basis of the execution result acquired in the notifying.

10. The management system according to claim 9, wherein the management apparatus displays an execution results of a step task of different stages defined in the batch task for the respective network devices as the execution targets.

11. The management system according to claim 9, wherein the management apparatus further provides a user interface in which the batch task can be defined by connecting the step tasks in a tree structure.

12. The management system according to claim 11, wherein execution of a step task of a next stage can be defined using the user interface according to a result of a step task of a previous stage.

13. A control method for an information processing apparatus that communicates with a network device via a network, the information processing apparatus, comprising:
   receiving an execution instruction of a batch task in which step tasks for respective stages are defined for network devices as execution targets;
   registering subtasks for the respective network devices as the execution targets, on a basis of information about the batch task corresponding to the received execution instruction,
   wherein one subtask defines one network device in the execution targets and same tasks as the step tasks included in the batch task, and the step tasks include a step task for distributing data to the network device; and
   executing the registered subtasks to distribute the data to the network devices as the execution targets.

14. A non-transitory computer-readable storage medium having instructions executable by a computer stored thereon that upon execution by the computer cause the computer to execute a control method for an information processing apparatus that communicates with a network device via a network, the method comprising:
   receiving an execution instruction of a batch task in which step tasks for respective stages are defined for network devices as execution targets;
   registering subtasks for the respective network devices as the execution targets, on a basis of information about the batch task corresponding to the received execution instruction,
   wherein one subtask defines one network device in the execution targets and same tasks as the step tasks included in the batch task, and the step tasks include a step task for distributing data to the network device; and
   executing the registered subtasks to distribute the data to the network devices as the execution targets.

* * * * *